Aug. 22, 1933.   J. H. HUNT   1,923,378
SYNCHRONIZING CLUTCH MECHANISM
Filed Jan. 11, 1932
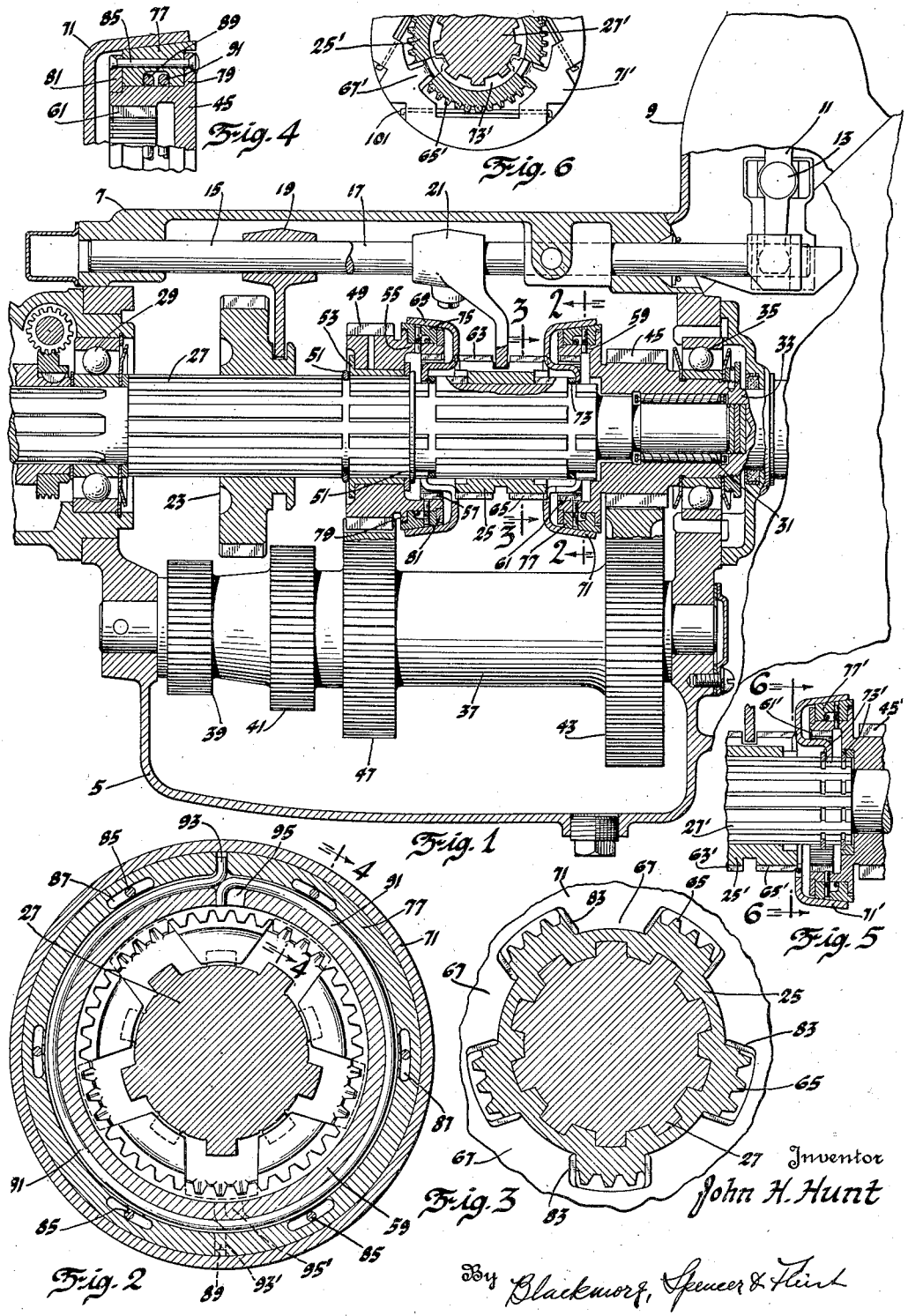
Inventor
John H. Hunt
By Blackmore, Spencer & Flint
Attorneys Patented Aug. 22, 1933

1,923,378

UNITED STATES PATENT OFFICE 1,923,378

SYNCHRONIZING CLUTCH MECHANISM

John H. Hunt, Detroit, Mich., assignor to General Motors Corporation, Detroit, Mich., a Corporation of Delaware Application January 11, 1932. Serial No. 585,990

4 Claims. (Cl. 192—53)

This invention relates to transmission mechanism and particularly to that type of transmission mechanism having constant mesh gears rendered active by successively engaging friction and jaw clutches.

A principal object of the invention is to provide a construction in which the jaw tooth engagement may take place without the release of the elements constituting the friction clutch.

As another object the above major object is to be secured in a combination including structure to operate under the influence of inertia to prevent the engagement of the jaw clutch elements prior to synchronization which is to be effected by the friction clutch.

Other objects and advantages will be understood from the following description.

In the accompanying drawing—

Fig. 1 is a longitudinal section through a transmission housing having therein transmission mechanism embodying my invention.

Fig. 2 is a section on line 2—2 of Fig. 1.

Fig. 3 is a section on line 3—3 of Fig. 1.

Fig. 4 is a section on line 4—4 of Fig. 2.

Fig. 5 is a longitudinal section of a modification.

Fig. 6 is a section on line 6—6 of Fig. 5.

Referring by reference characters to the drawing, the numeral 5 represents a housing for the transmission. At 7 is shown a cover closing the top of the housing, the cover having as a part thereof the dome 9 within which is the fulcrum 13 for a conventional gear shift lever 11. The movements of the lever operate to reciprocate shift rods 15 and 17 in the usual way. These shift rods are equipped with forks 19 and 21. The fork 19 engages a collar on the low speed driven gear 23 and the fork 21 similarly engages a double clutch member 25, this clutch member being designed to reciprocate in making shifts for second speed and for high speed.

The main shaft or splined shaft is represented by numeral 27. It is shown provided with a bearing support 29 in the rear wall of the housing. Its front end is rotatably supported by a bearing 31 within a recess in the inner end of the driving shaft 33, which shaft 33 is itself rotatably supported by a bearing 35 in the front wall of the housing.

The countershaft is represented by numeral 37 and is supported on a shaft mounted as usual in the front and rear walls of the casing. This countershaft is provided with gears 39 and 41, the latter for engagement with sliding gear 23 when driving at low speed. Gear 39 is in constant engagement with a reverse idler, not shown, which is itself to be engaged by gear 23 when the latter is moved to the rear from its neutral position as shown in Fig. 1. The last named arrangement of gears is used for driving in reverse.

The countershaft 37 is constantly driven by a gear 43 rigid therewith and in mesh with a gear 45 on the driving shaft 33. Also on the countershaft is a a gear 47 in constant mesh with a gear 49. Gear 49 is rotatably supported on a collar 53 which is held from axial movement on spline shaft 27 by retainers 51.

Gear 49 has an annular flange 55 provided with internal clutch teeth 57. The inner end of the driving shaft beyond gear 45 has a similar flange 59 which is also provided with internal clutch teeth 61.

The sliding clutch member 25 is splined on the main shaft 27 and has external teeth adjacent its ends as at 63 and 65. These teeth are arranged to engage teeth 57 and 61 respectively whereby the transmission is capable of affording second speed and high speed in the well known way. It will be noted that the adjacent ends of the engaging teeth are chamfered to facilitate intermeshing.

The teeth 63 and 65 do not extend continuously around the clutch member 25. The toothed regions alternate with spaces into which project radial fingers 67 of friction drums 69 and 71. These drums are located at the ends of clutch member 25 and between the clutch member and the flanges 55 and 59 respectively. The drums are mounted on shaft 27 for a slight rotation relative thereto and they have a slight axial movement thereon, there being means 73 to limit the axial movement. After friction clutch members, to be described below, have effected synchronization the further axial movement of the clutch member 25 causes the complete engagement of the jaw teeth as will be obvious. The outer parts of drums 69 and 71 overlie the flanges 55 and 59 as shown. The flanges support conical friction members 75 and 77, these members being held on the flanges by radial projections 79 and retaining rings 81. The outer surfaces of the members 75 and 77 are conical and the drums 69 and 71 are similarly shaped, these thus constituting friction cone clutches. The inter-engaging parts of the clutch member 25 and the drums 69 and 71 have cam surfaces 83 whereby, in a well known way, the jaw teeth may be kept from coming into engagement by the relative rotation of the parts until synchronization is effected by the friction clutch.

In prior constructions of this general kind the frictional members associated with the equivalent of the flanges 55 and 59 have been fixed relative to their supports. In my present invention there are headed pins or rivets 85 securing the radial projections 79 and the retainers 81. These rivets pass through circumferential slots 87 in the friction members 75 and 77 so that the friction members are capable of a limited rotary movement upon their supporting flanges. Normally the pins 85 are midway between the ends of the slots 87 but the friction rings may rotate so that the pin 85 reaches one or the other of the ends of the slots. In connection with this rotation there is provided spring means which becomes tensioned and operates to restore the friction members to their normal positions. To that end there are provided two spring rings 89 and 91 arranged side by side in a groove on the inner wall of each of the friction members (see Fig. 4). One end of each spring is turned radially outward and anchored in the friction member as at 93 and 93' in Fig. 2. The anchored ends of the two springs are arranged in diametrically opposite positions. Each spring consists of a single turn and the opposite ends of the springs are bent radially inward and enter slots 95 and 95' in the supporting flanges. The anchored ends and the slots are so arranged that with either direction of rotation one of the springs is expanded in the groove to a somewhat greater diameter. The tension thus imparted to the expanded spring is operable to restore the friction ring to its normal position.

The operation may be briefly described and is substantially as follows. Fig. 1 shows the parts in neutral position. It may be assumed that the vehicle has been traveling at low speed and a shift into second speed is about to be made. From its normal position as shown in Fig. 1 the clutch member 25 is moved toward the rear. The relative movement between drum 69, which is rotating with shaft 27, and ring 75 which is rotating under the influence of the free rotation of gears 45, 43, 47, 49 (the main clutch having been released) causes the ring 75 to turn on its flange 55 to the limit of its free movement. The pin 85 then approaches one end of the slot 87 and one of the springs 89 or 91 becomes tensioned. The frictional drag between 69 and 75 causes a slight rotation of drum 69 relative to clutch member 25 and the cam faces at 83 engage and tend to prevent further axial movement of clutch member 25 until synchronization is effected by the friction clutch. When the circumferential forces which have been acting to effect synchronization cease to operate, the tensioned spring (89 or 91) tends to restore the friction ring 75 to its neutral position. The axial movement of 25 is then resumed; no longer being resisted by the effect of the friction clutch acting through the engaging faces at 83. If, in moving, the clutch teeth 63 and 57 chance to be in a position for correct inter-engagement, complete engagement of the jaw teeth takes place. If, however, they are not in such position the chamfered ends of the teeth come in contact. Complete engagement can then occur only by rotation of gear 49 relative to shaft 37. If the friction clutch elements are gripping firmly it may be difficult for the engaging ends of the teeth to exert a force sufficient to dislodge the elements 69 and 75 and to so rotate gear element 49 as to permit the full engagement of teeth 63 and 57. Such disengagement of the elements of the friction clutch, in case the friction ring is carried fixedly by the gear 49, as in some known construction, is believed to be usually effected by a jarring action or by the axial component of the camming action resulting from the engagement of the chamfered ends of teeth 63 and 57. If the friction elements of such prior constructions are gripping forcibly and if the oil through which gears 49, 47, 43, and 45 are turning is quite viscous it may be very difficult for the force applied manually to the shift lever to so rotate the gears and loosen the friction grip for providing complete toothed engagement. To overcome this difficulty the resiliently restrained relative movement of ring 75 has been provided. Axial pressure between the chamfered ends of the teeth 63 and 57 causes rotation of gear 49 (together with gears 47, 43, and 45) relative to the friction ring 75 which is being held by friction to the drum 69. This provides for only a light resistance to the complete engagement of the jaw teeth for positive driving while the elements of the friction clutch remain engaged. A similar action occurs when shifting into high speed. In each case after the complete engagement of the jaw teeth (with the friction elements still engaged) the tensioned spring (89 or 91) will function to release the engagement of the frictional clutch elements and permit the restoration of the friction ring to the neutral position illustrated by Fig. 2.

While the oil film between friction elements 75 and 69 is believed to be sufficient to initiate the action of the friction clutch and, through the engagement of the faces at 83, to prevent engagement of the jaw teeth without first synchronizing the engaging parts, the invention may be used with a known construction in which positive means is employed to insure the desired sequential action of the friction and jaw clutches. This is provided in the modified form of Figs. 5 and 6. In these figures 27' is the spline shaft and 25' the sliding clutch member having two sets of teeth 63' and 65'. The friction drum 71' is mounted on shaft 27' with provision for slight rotary movement and for slight axial movement, the latter movement being limited by retainers 73'. At 45' is the gear element on the driving shaft. The internal clutch teeth are shown at 61' and the resiliently held clutch ring is designated by numeral 77'. These parts are like their counterparts in Fig. 1 and function in a similar way. The drum has radial fingers 67', the spaces between which receive the toothed parts of the clutch member 25'. The clutch teeth engage resilient wires 101 caried tangentially by the friction drum as the clutch member 25' moves axially. This insures the engagement of the friction clutch members 71' and 77' so that the friction clutch may first come into action and synchronize the parts prior to the engagement of the jaw teeth. After synchronization the teeth move under the wires 101 and the jaw teeth engage. In other respects this form of the invention resembles that first described.

The invention therefore provides a very simple means for completing the jaw clutch engagement while the frictional clutch elements are still in gripping contact.

I claim:

1. In a synchronizing transmission, driving and driven members, successively operable friction clutch elements and jaw clutch elements to effect driving engagement between said members, spring means operably connected to one of said members and to one of said frictional clutch elements whereby the jaw clutch elements may be circumferentially adjusted and inter-engaged while the friction clutch elements remain in engagement.

2. The invention defined by claim 1, one of said members and one of said friction clutch elements being mounted for limited relative rotation.

3. In combination, a shaft, a clutch member having jaw teeth slidably splined on said shaft, a transmission member mounted for rotation relative to said shaft and having cooperating jaw teeth, a friction element supported by and having limited rotation relative to said transmission member, a second slidable cooperating friction clutch element, engaging faces on said clutch member and slidable friction element, said faces held in engagement by the relative rotation between said member and frictional element to prevent the engagement of the jaw teeth prior to synchronization by the friction clutch and yielding means operably connected to the transmission member and the friction element supported thereby and tensioned by relative movement therebetween in either direction of relative rotation.

4. The invention defined by claim 3, said yielding means being constituted by a plurality of single turn coils, each coil fixedly anchored in one of said parts and having a lost motion connection with the other part at its opposite ends.

JOHN H. HUNT.